United States Patent Office 2,905,598
Patented Sept. 22, 1959

2,905,598
PURIFICATION OF ACRYLIC ACID ESTERS

Helmut Zinke-Allmang, Otto Leichtle, Georg von Bank, and Rudolf Keller, Ludwigshafen (Rhine) Germany, assignors to Badische Anilin- & Soda-Fabrik Aktiengesellschaft, Ludwigshafen (Rhine), Germany No Drawing. Application June 13, 1958
Serial No. 741,733

Claims priority, application Germany June 22, 1957

5 Claims. (Cl. 202—57)

This invention relates to a process for purifying acrylic esters by adding small amounts of boron trifluoride to the crude esters before or during the distillation.

Acrylic esters are prepared industrially by esterification of acrylic acid with alcohols. The acrylic acid used for the esterification is obtained from acetylene, carbon monoxide and water. It is however also possible to prepare acrylic esters by direct synthesis from acetylene, carbon monoxide and alcohols. The acrylic esters prepared by the esterification of industrial acrylic acid with alcohols, especially, often contains small amounts of impurities which contain oxygen or are also strongly unsaturated. These small impurities can no longer be detected analytically. They cannot even be detected by an infrared spectrum analysis. Since these impurities, which may be for example cyclic ethers, ketones or acetals, often have the same boiling point as or a similar boiling point to the esters, or form azeotropic mixtures therewith, they also cannot be removed by distillation. These small amounts of impurities can however be established by a color reaction which occurs for example after the addition of concentrated sulfuric acid to the esters. Pure esters show no discoloration when treated in this way. Although the amount of impurities is only very small, they considerably disturb the further working up of the acrylic esters in certain cases; in particular the polymers of these esters become yellow rapidly.

It is already known that acrylonitrile can be purified by treatment with chlorine. A chlorine treatment has also already been proposed for the purification of industrial acrylic esters. This measure has the disadvantage however that it must be carried out in the cold and that the ester which has been treated with chlorine must subsequently be washed with aqueous alkali. By distillation, there then usually occurs a splitting off of hydrogen chloride from the chlorinated impurities. Moreover loss of yield also readily occurs by additions to the double linkage.

We have now found that acrylic esters can be purified advantageously by treating them with a small amount, i.e. from 0.05 to 0.5 percent by weight with reference to the weight of the ester, of boron trifluoride and distilling the so treated esters. An acrylic ester which has been thus treated before or during its distillation no longer shows any discoloration after the addition of concentrated sulfuric acid. Boron fluoride evidently forms stable addition compounds with the injurious impurities or reacts therewith to form products of which the boiling points or decomposition temperatures lie higher than the boiling point of the ester so that the latter can be separated from the impurities by simple distillation under normal or decreased pressure. The ester distilled off contains practically no boron trifluoride or only traces of the same which can be removed by packing a thin layer of a basic substance, as for example granular calcium oxide, in the upper part of the distillation column or adding sodium fluoride during the distillation.

Examples of acrylic esters which may be purified according to this invention are methyl acrylate, ethyl acrylate or other acrylic esters of aliphatic alcohols containing up to 18 carbon atoms in the molecule.

It would also be possible to use for the purification of the esters, instead of boron trifluoride, other Friedel-Crafts catalysts, for example aluminum chloride, iron trichloride or titanium tetrachloride, but their use is not attended by any advantage as compared with the use of boron trifluoride, but rather the hydrolytic splitting off of hydrogen halide becomes disturbingly evident when using these other Friedel-Crafts catalysts.

A special advantage of the use of boron trifluoride for purifying industrial acrylic esters lies in the fact that it does not exert either a catalytic or a polymerizing action of the ester to be treated. Contrasted with halogens or sulfuric acid it also does not act as an oxidizing or reducing agent. Boron trifluoride forms with water addition compounds of high boiling point so that no free hydrofluoric acid passes by hydrolysis into the pure ester. Boron fluoride is the strongest known acceptor molecule and it can therefore be added in much smaller amounts than any other reagent.

The following examples will further illustrate this invention but the invention is not restricted to these examples. The parts specified in the examples are parts by weight and the percentages are percentages by weight.

Example 1

Gaseous boron trifluoride is led through a metering device into the crude ester supply to the purifying distillation of methyl acrylate. The metered amount is 0.05 to 0.5 percent of the supply. By the distillation, the ester is obtained in pure condition without a color number, whereas the ester distilled for comparison without boron trifluoride has a color number of 50 to 80. Polymers prepared from the ester which has been treated with boron trifluoride no longer show yellowing phenomena. The polymers from esters which have not been treated with boron trifluoride on the contrary yellow strongly.

Example 2

A weighed amount of boron fluoride (amounting to 0.05 percent of the crude ester) is added to ethyl acrylate. After stirring for 10 to 12 hours at room temperature, there is obtained by distillation an ester having no color number. Polymers prepared from the ester thus purified exhibit no yellowing phenomena. If for purposes of comparison the same ester is distilled without adding boron trifluoride, the color number amounts to 50 to 80 and polymers prepared therefrom yellow strongly.

What we claim is:

1. A process for purifying a crude acrylic acid ester containing small amounts of impurities selected from the group consisting of oxygen-containing and strongly unsaturated organic compounds, said process comprising: adding to the crude ester from 0.05 to 0.5 percent by weight of boron trifluoride, with reference to the weight of the ester; and distilling the so-treated ester.

2. A process for purifying a crude acrylic acid ester of an aliphatic alcohol having from 1 to 18 carbon atoms, the crude ester containing small amounts of impurities selected from the group consisting of oxygen-containing and strongly unsaturated organic compounds, said process comprising: intimately mixing with the crude ester from 0.05 to 0.5 percent by weight of boron trifluoride, with reference to the weight of the ester; and subsequently distilling the so-treated ester.

3. A process for purifying a crude acrylic acid ester of an aliphatic alcohol having from 1 to 18 carbon atoms, the crude ester containing small amounts of impurities selected from the group consisting of oxygen-containing and strongly unsaturated organic compounds, said process comprising: distilling said ester while simultaneously adding thereto from 0.05 to 0.5 percent by weight of boron trifluoride, with reference to the weight of ester being distilled.

4. A process for purifying a crude methyl acrylate containing small amounts of impurities selected from the group consisting of oxygen-containing and strongly unsaturated organic compounds, said process comprising: adding to the crude methyl acrylate from 0.05 to 0.5 percent by weight of boron trifluoride, with reference to the weight of methyl acrylate; and distilling the so-treated methyl acrylate.

5. A process for purifying a crude ethyl acrylate containing small amounts of impurities selected from the group consisting of oxygen-containing and strongly unsaturated organic compounds, said process comprising: adding to the crude ethyl acrylate from 0.05 to 0.5 percent by weight of boron trifluoride, with reference to the weight of ethyl acrylate; and distilling the so-treated ethyl acrylate.

References Cited in the file of this patent

UNITED STATES PATENTS

| | | |
|---|---|---|
| 2,021,873 | Nicodemus et al. | Nov. 19, 1935 |
| 2,156,093 | Lange et al. | Apr. 25, 1939 |
| 2,484,067 | Boise | Oct. 11, 1949 |